Sept. 12, 1967  F. GABRON ETAL  3,340,722
APPARATUS AND METHOD FOR MEASURING TOTAL
HEMISPHERICAL EMITTANCE OF A SAMPLE BODY
Filed Sept. 23, 1964
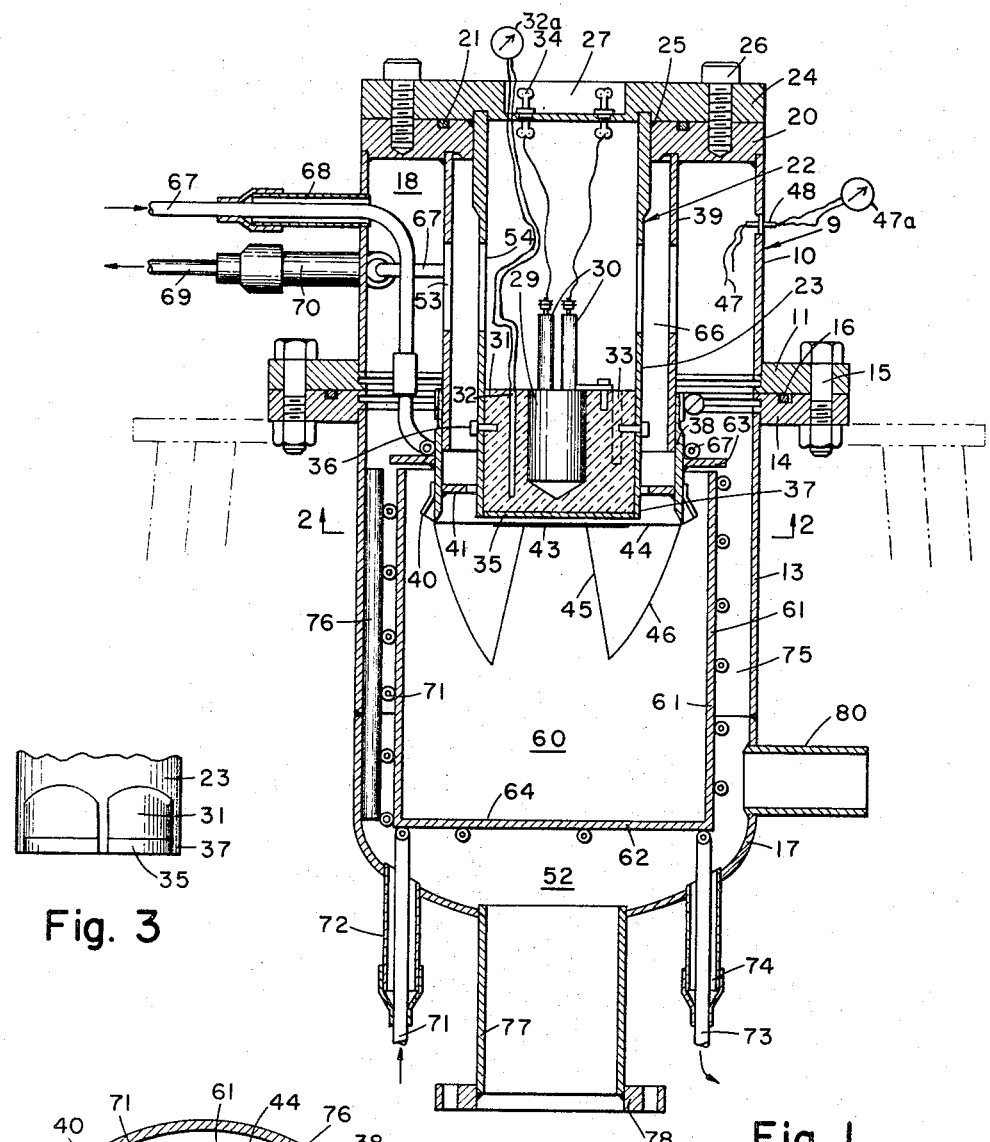
Fig. 1
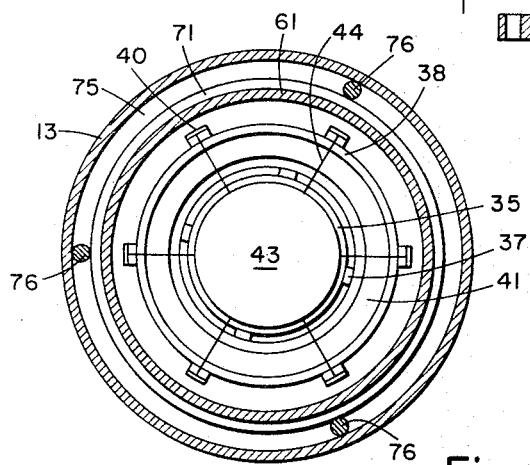
Fig. 3
Fig. 2
INVENTORS
Frank Gabron
Raymond W. Moore, Jr.
BY
Attorney

United States Patent Office 3,340,722
Patented Sept. 12, 1967

3,340,722
APPARATUS AND METHOD FOR MEASURING TOTAL HEMISPHERICAL EMITTANCE OF A SAMPLE BODY
Frank Gabron, Carlisle, and Raymond W. Moore, Jr., Brookline, Mass., assignors to Arthur D. Little, Inc., Cambridge, Mass., a corporation of Massachusetts
Filed Sept. 23, 1964, Ser. No. 398,552
7 Claims. (Cl. 73—15)

ABSTRACT OF THE DISCLOSURE

Apparatus for rapidly determining the total hemispherical emittance of a sample body, the sample being maintained at a predetermined temperature, preferably slightly above room temperature, and a thin receiver disc being positioned in parallel relation to the sample. The receiver disc "sees" the sample on one side and a cold black cavity on the other. The entire apparatus is maintained in an evacuated, insulated housing.

The invention described herein was made in the performance of work under a NASA contract and is subject to the provisions of the National Aeronautics and Space Act of 1958, Public Law 85–568 (72 Stat. 426; 42 U.S.C. 2451), as amended.

Emittance may be defined as a total property of a surface which takes into account both its emissivity and other physical characteristics such as roughness. In the design of apparatus suitable for measuring temperatures, in spacecraft coatings used to control temperatures, and generally in apparatus where thermal conditions are influenced by heat transfer through radiation, it is essential to know the emittance of the various surfaces involved.

A number of types of emissometers are available on the market. Generally those which attain great accuracy require extended periods of time to make the measurements desired; while those which permit a rapid evaluation of emittance lack accuracy. The apparatus of this invention in essence combines the desirable features of the prior art devices in that it permits accuracy of measurement in a relatively short period of time. It is, for example, possible to obtain in about one hour an accurate determination of emittance of a sample surface with an accuracy of ±10%.

It is therefore a primary object of this invention to provide a novel apparatus for accurately determining the total hemispherical emittance of a sample body. It is another object of this invention to provide apparatus of the character described which permits such a determination within a relatively short period of time. It is yet another object to provide an improved emissometer which is relatively simple to operate. It is still another object to provide such apparatus which makes possible the accurate determination of emittance over the very low value ranges. Other objects of the invention will in part be obvious and in part be apparent hereinafter.

For a fuller understanding of the nature and objects of the invention, reference should be had to the following detailed description taken in connection with the accompanying drawings in which:

FIG. 1 is a vertical cross-sectional view of the emissometer of this invention;

FIG. 2 is a cross-section taken along line 2—2 of FIG. 1; and

FIG. 3 is a side view of a portion of the sample holder.

The invention accordingly comprises the features of construction, combination of elements and arrangement of parts which will be exemplified in the construction hereinafter set forth, and the scope of the invention will be indicated in the claims.

The emissometer of this invention attains accuracy and speed through the use of a relatively large temperature difference to which a black receiver disc is exposed. This is accomplished by placing the receiver disc in a position to see the warm surface of the sample on one side and a black cavity maintained at near liquid nitrogen temperature on the other side. Heat transfer other than that due to radiation between the sample and the disc and between the disc and the cavity, is kept at a minimum level through the use of a minimal support system, radiation shields and a low-pressure environment.

The emissometer is shown in two cross-sectional views in FIGS. 1 and 2. It comprises an outer vessel, generally indicated by the numeral 9, made up of an upper cylindrical housing 10, having a flange 11, and a lower cylindrical housing 13 having a flange 14. By means of suitable bolts 15 and through flanges 11 and 14 the two sections of the cylindrical housing are sealed, using a suitable sealing ring 16 to insure a vacuum-tight seal. The bottom of the outer vessel 9 comprises a rounded section 17 having suitable openings for conduits to a vacuum system, as will be described later, and being welded to the lower cylindrical section 13. Welded to the top of the upper cylindrical section 10 is an annular support plate 20; and the top of the outer vessel is sealed by means of a top plate 24, having a recess 27, which is bolted to annular support plate 20 with bolts 26 to maintain a vacuum-tight seal with the help of a suitable sealing ring 21. There is thus defined within the outer vessel 9 an evacuatable volume 18.

Within the evacuated volume 18 there is a sample holder and heater assembly generally indicated at 22, consisting of a support tube 23, which is a hollow cylinder having referencing extensions 37, and a mounting block 31. This support tube 23 is welded to top plates 24 and depends therefrom. Within the mounting block 31 is a heater 29 having suitable insulated leads 30 which are connected to external terminals 34 in recess 27. This block surrounds the heater 29 and occupies the entire volume between the heater and the internal wall of the support tube 23, thus making thermal contact with the bottom portion of the cylindrical walls. This mounting block 31 serves as a heat sink to stabilize temperatures and is preferably made of copper, but may be of any metal having a high thermal conductivity. The block 31 has a thermocouple well 32 and a thermistor well 33 which contain suitable apparatus for measuring and controlling the temperature of the block 31, and hence of the sample. The thermocouple and thermistor are of well-known designs and need not be further described except to indicate suitable electrical connections to temperature measuring means such as 32a.

The sample 35, the emittance of which is to be evaluated, is adhered, such as through the use of a pressure-sensitive adhesive tape or other suitable adhesive, to the bottom surface of the mounting block 31. Inasmuch as it will be desirable to use samples of varying thicknesses while maintaining the receiver disc in the same relative position with respect to the sample surface, means are provided for adjusting the position of the mounting block 31 to accommodate different sample thicknesses. The mounting block 31 is held in position within the support tube 23 by means of screws 36 which pass through slots, not shown, in the wall of the support tube. These slots allow for some up-and-down adjustment of the mounting block. After the sample 35 has been affixed to the end of the mounting block, the block is vertically adjusted so that the exposed surface of the sample, which is to be seen by the receiver disc, is precisely flush with the ends of the four references extensions 37 of the support tube as shown in FIGS. 2 and 3. An examination of FIG. 3 will show that by moving mounting block 31 it is possible to provide precisely the correct amount of space for the sample and still have its surface flush with the ends of extensions 37. By aligning the sample with all four extensions it is possible to assure the desired alignment and positioning of the sample in a given plane within the apparatus.

Inasmuch as the receiving disc which is exposed both to the warm sample and the cold black cavity must be suspended below the sample surface and parallel to it, it is necessary to provide suitable means for holding it in position, these means being capable of minimizing any heat transfer by conduction to the disc. In order to do this there is supplied a disc mounting ring 38 which is affixed to the bottom portion of a disc mounting ring support 39 which in turn is welded to the annular ring support 20 and surrounds the sample holder 23. At the bottom end of the disc mounting ring 38 are positioned spring clips 40 spaced around the periphery (FIG. 2). Within the disc mounting ring 38 and welded to its internal wall is an annular radiation shield 41 which does not make contact with the external wall of the sample holder 23 but effectively blocks radiative heat transfer into the cold cavity.

The black receiver disc 43 is held in spaced relationship under the sample 35 by means of fine receiver support wires 44 which are soldered to the spring clips 40 and in passing over the disc mounting ring 38 are maintained taut so that the disc may be maintained in the position shown. The receiver disc is preferably very thin, typically two-mil foil, to minimize its thermal mass and thereby to make possible rapid determinations of emittance. This disc is of course black and may be for example aluminum foil with black paint or gold foil covered with gold black. The black receiver disc 43 occupies a fixed position within the apparatus by reason of the geometry and construction of the means which holds it. The use of the sample holder described above through its geometry, construction, and adjustability for various sample thicknesses likewise means that the exposed surface of the sample is always maintained in a fixed position with respect to the receiver disk surface. Thus the sample and the receiver disc are always parallel to each other and are always spaced apart by the same distance. This is essential for accurate, reproducible measurements since emittance is calculated on the assumption that the sample and the disc represent two infinitely parallel plates. It will be apparent that accuracy of positioning these elements in this apparatus is readily achieved.

Inasmuch as the measurements made by the emissometer are in terms of the temperature of the black receiver disc 43, there are provided duplicate thermocouple systems which comprise fine thermocouple wires 45 which are in contact with the disc and heavier thermocouple wires 46 which are in turn connected to thermocouple leads 47 (shown in fragmentary view) which are brought out of the evacuated area through a suitable seal 48 and connected to suitable temperature measuring means such as 47a.

The interior volume 18 of the outer vessel is, as noted above, evacuated and in order to permit rapid equalization of pressures throughout, both the disc mounting ring support 39 and the support tube 23 have large apertures 53 and 54, respectively, around their circumferences.

In order to expose the receiver disc 43 to a low temperature on its lower side there is provided a cold black cavity 60 defined by a cylindrical side wall 61 and a bottom plate 62. The height of the cavity is such that it extends slightly above the point at which the spring clips 40 are attached to the disc mounting ring 38, thus defining an opening around the disc mounting ring support 39 which is effectively closed to radiation by means of the annular radiation shield 63. The interior surface 64 of the cavity 60 is blackened with a suitable coating.

In order to maintain the disc mounting ring 38, radiation shields 41 and 63, and the black cavity 60 at a low temperature, and thus establish the temperature differential to which the receiver disc is exposed, it is necessary to cool these elements by refrigeration. This is done by passing liquid nitrogen, or any other suitable cryogenic fluid, first through coil 67 which is in thermal contact with radiation shield 63, disc mounting ring 38 and radiation shield 41. The ability to cool the disc mounting ring 38 is particularly important in obtaining accurate emittance measurements of low-emittance samples because it minimizes the temperature difference between the support and the disc. With low-emittance samples, the radiative flux to the disc is low and therefore the disc temperature is low and approaches that of the black cavity. As the emittance decreases, the disc temperature decreases and the error due to the conduction from the disc to the support could become important if the support itself were not cooled. By maintaining conduction from the disc to the support at a minimum it remains small in comparison to the radiative flux from the sample to the disc which is being evaluated and accuracy in emittance measurements is retained.

Coil 67 in which the refrigerating fluid circulates enters the evacuated volume 18 through a suitable extension 68. After making thermal contact with the disc mounting ring 38 and radiation shields 63 and 41 the liquid nitrogen coil 67 is brought out of the system as tubing 69 through a suitable extension 70 and re-enters it as coil 71 into the bottom portion of the system through suitable extension 72. The coil 71 is then wrapped about the bottom 62 and the side 61 of the cavity and leaves as discharge coil 73 through a suitable extension 74.

Periodically spaced within the passage 75, defined between the black cavity and the bottom cylindrical section 13 of the outer vessel, are several rods 76 of a suitable insulating material, such as Micarta, which serve to retain the black cavity 60 in its position relative to the inner wall of the outer vessel with a minimum amount of transfer.

A suitable conduit 77 with a flange 78 for making connections is provided for connecting to a diffusion pump system used to maintain the interior at a pressure of about $10^{-6}$ torr or lower after the volume has been roughed out by suitable pump system connected through conduit 80.

In the operation of this emissometer the receiver disc 43, which typically is a circular thin metal blackened disc about 2.5 inches in diameter, in its position indicated exchanges heat with the sample 35 on one side and with the black cavity 60 on the other side. Such heat exchange is principally by radiation heat transfer. The geometry of the apparatus is such that the heat transfer between the sample and the receiver disc is essentially equivalent to that between two infinite parallel plates. Radiative transfer between the bottom side of the disc and the black cavity is essentially that between two black bodies. Hence a heat balance on the disc yields the equation $$e_s \sigma(T_s^4 - T_d^4) = \sigma(T_d^4 - T_c^4)$$

$$e_s = \frac{T_d^4 - T_c^4}{T_s^4 - T_d^4} \qquad (1)$$

where $e_s$ is the total hemispherical emittance of the sample,
$T_s$ is the sample temperature, ° R.,
$T_d$ is the receiver disc temperature, ° R., and
$T_c$ is the cavity temperature, ° R.,
$\sigma$ is the Stefan-Boltzmann constant, B.t.u./hr.-ft.$^2$-° R.$^4$.

Thus if the sample temperature, the cavity temperature and the disc temperature are measured the total hemispherical emittance of the sample can be determined. Generally in this apparatus the sample temperature will be maintained constant at a value slightly above room temperature. By cooling the cavity with liquid nitrogen its temperature is maintained at 77° F. and hence there is a relatively large temperature differential across the receiver disc.

Extended experience with the emissometer of this invention has indicated that it is possible to evaluate emittance of sample bodies within an accuracy of plus or minus 10%, these measurements requiring no more than about one hour.

From the above detailed description of the emissometer of this invention it will be seen that there is provided a relatively simple apparatus capable of accurately and rapidly determining the emittance of a sample body. It will thus be seen that the objects set forth above, among those made apparent from the preceding description, are efficiently attained and, since certain changes may be made in the above construction without departing from the scope of the invention, it is intended that all material contained in the above description or shown in the accompanying drawings shall be interpreted as illustrative and not in a limiting sense.

It is also to be understood that the following claims are intended to cover all of the generic and specific features of the invention herein described and all statements of the scope of the invention which as a matter of language might be said to fall therebetween.

We claim:
1. An apparatus for measuring total hemispherical emittance of a sample body, comprising in combination
   (a) sample holding means comprising a hollow cylindrical support tube having apertures in the wall thereof and having therein a mounting block adapted for adhering said sample thereto;
   (b) heating means associated with said sample holding means and adapted to maintain said sample at an essentially constant temperature;
   (c) a black receiver disc;
   (d) receiver disc supporting means adapted to hold said disc below said sample and spaced therefrom;
   (e) enclosure means defining a black cavity surrounding said receiver disc and said sample;
   (f) means for cooling said enclosure means defining said black cavity with a cryogenic fluid;
   (g) a vacuum-tight housing enclosing the elements recited in (a) through (f); and
   (h) means for measuring the temperature of said sample and of said black receiver disc.

2. An apparatus in accordance with claim 1 wherein said heating means are positioned within said mounting block.

3. An apparatus in accordance with claim 1 further characterized in that said support tube has reference extensions at the bottom end thereof and that the position of said mounting block in said support tube is adjustable whereby the exposed surface of said sample may be positioned flush with the ends of said extensions and thereby be accurately positioned with respect to said receiver disc.

4. An apparatus in accordance with claim 1 wherein said receiver disc supporting means comprises, in combination
   (a) a hollow cylindrical member depending from the top of said vacuum-tight housing and having apertures in the wall thereof, and said member surrounding the sample holding means;
   (b) disc mounting ring means affixed to said hollow cylindrical member; and
   (c) thin wires connecting said ring means and said disc and being adapted to retain said disc in position under said sample.

5. An apparatus in accordance with claim 4 further characterized by having annular radiation shielding means affixed internally and externally of said ring means whereby radiative heat transfer into said cavity is minimized.

6. An apparatus in accordance with claim 5 further characterized by having means for circulating a cryogenic fluid in thermal contact with said radiation shielding means and said ring means.

7. An apparatus in accordance with claim 1 wherein said means for cooling said enclosure means defining said black cavity comprise coils in thermal contact with the external walls of said enclosure means and means for circulating a cryogenic fluid through said coils.

References Cited
UNITED STATES PATENTS

| | | | |
|---|---|---|---|
| 3,258,602 | 6/1966 | Promish | 250—83.3 |
| 3,266,290 | 8/1966 | Haacke | 73—15 |
| 3,277,715 | 10/1966 | Vanderschmidt | 73—355 |

LOUIS R. PRINCE, *Primary Examiner.*

F. SHOON, *Assistant Examiner.*